United States Patent [19]

Samour et al.

[11] 4,198,520

[45] Apr. 15, 1980

[54] NONIONIC MONOMERIC EMULSION STABILIZERS

[75] Inventors: Carlos M. Samour, Wellesley; Mildred C. Richards, Wakefield, both of Mass.

[73] Assignee: The Kendall Company, Boston, Mass.

[21] Appl. No.: 844,288

[22] Filed: Oct. 21, 1977

Related U.S. Application Data

[60] Continuation of Ser. No. 643,435, Dec. 22, 1975, abandoned, which is a division of Ser. No. 265,244, Jun. 22, 1972, Pat. No. 3,960,935.

[51] Int. Cl.$^2$ .............................................. C07C 69/80
[52] U.S. Cl. ...................................... 560/83; 560/85; 560/90; 560/91
[58] Field of Search ...................... 560/89, 90, 91, 198, 560/199, 83, 85

[56] References Cited

U.S. PATENT DOCUMENTS

| 3,367,992 | 2/1968 | Bearden | 560/90 |
| 3,960,935 | 6/1976 | Samour | 560/90 |

Primary Examiner—Jane S. Myers
Attorney, Agent, or Firm—Norman Blumenkopf; Herbert S. Sylvester; Murray M. Grill

[57] ABSTRACT

Compounds containing a lipophilic radical, a polyethyleneoxy group and an ethylenically unsaturated radical are disclosed. The compounds are useful as nonionic monomeric emulsion stabilizers.

1 Claim, No Drawings

NONIONIC MONOMERIC EMULSION STABILIZERS

This is a continuation of application Ser. No. 643,435, filed Dec. 22, 1975, now abandoned, which is a divisional of Ser. No. 265,244, filed June 22, 1972, now U.S. Pat. No. 3,960,935.

This invention relates to stabilizing agents for emulsion polymerization. More particularly, it relates to a class of nonionic compounds which serve simultaneously as stabilizing agents for emulsion polymerizations and as monomeric reactants in the polymerization, so that the compounds become an integral part of the polymer, which is thereby self-stabilized without the use of surfactants.

Polymeric latices, derived from ethylenically unsaturated monomers, are widely used for a variety of applications, such as adhesive masses and binders for nonwoven fabrics. Most conventional polymeric latices are produced by an emulsion polymerization process, in which monomeric materials are polymerized while they are dispersed in an aqueous medium by means of a surface active agent. The surface active agent may be anionic in nature, such as soap or sodium lauryl sulfate. Alternatively, it may be of a nonionic type as represented by various ethylene oxide derivatives, or by polyhydroxy compounds, or it may be cationic, as represented by tetra-alkyl ammonium halides.

However, conventional surface active agents result in the presence of a water-sensitive ingredient in the final polymeric latex, a disadvantage in areas wherein wet strength and resistance to water are desirable.

Recently it has been discovered that the presence of water-sensitive elements in a polymeric latex can be avoided by using certain monomeric emulsion stabilizers, that is, organic monomers which copolymerize with the ethylenically unsaturated monomers, becoming part of the final polymer, but which stabilize the polymerization process against the formation of coagulum and against subsequent phase separation. These compounds, which are all ionic in nature, are quaternary ammonium salts, and have been described in Applicants' copending patent applications, Ser. Nos. 110,588; 867,899; 40,718; 40,705; 40,719 and 40,715.

While the ionic monomeric emulsion stabilizers avoid the presence of water-sensitive ingredients in latexes, there is still a need for a nonionic surfactant for applications where the presence of ionic species would be undesirable.

Now it has been found in accordance with this invention that selected compounds containing a lipophilic radical, a polyethyleneoxy group and an ethylenically unsaturated radical are excellent monomeric emulsion stabilizers and possess the advantages of nonionic surfactants. Thus, emulsions prepared using these compounds have mechanical and freeze-thaw stability, increased particle sizes and are stable to electrolytes.

More particularly, the nonionic monomeric emulsion stabilizers of this invention have the formula

R—O—V    (I)

wherein V is acryloyloxyethyl, methacryloyloxyethyl, acryloyloxy-2-hydroxypropyl, methacryloyloxy-2-hydroxypropyl, allyl, methallyl, alloxy-2-hydroxypropyl or methallyloxy-2-hydroxypropyl and R is

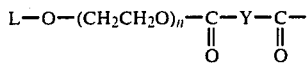

wherein L is a lipophilic radical and Y is alkylene having 2 or 3 carbon atoms, —CH=CH—,

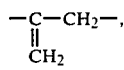

phenylene or phenylene in which one or more of the hydrogen atoms is replaced by a lower alkyl group (1 to 4 carbon atoms) or by a halogen atom, with the proviso that the number of ring carbon atoms between the two carbonyl groups is 2; and n is an integer from 9 to 50; or R is

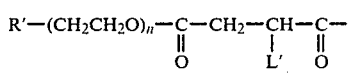

wherein L' is an aliphatic hydrocarbon chain, R' is alkoxy or acyloxy, preferably methoxy, ethoxy, acetoxy, propionoxy, or hydroxyl, and n is as previously described.

By the term "aliphatic hydrocarbon chain" in the claims and specification herein is meant a chain having from about 8 to about 28 carbon atoms, including saturated, unsaturated, straight chain and branched groups. By the term "lipophilic radical" in the claims and specification herein is meant a polyoxypropylene having the formula

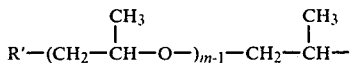

where R' is as previously described and m is an integer from 10 to 30 or a radical comprising an aliphatic hydrocarbon chain as previously described. The aliphatic hydrocarbon chain in the lipophilic radical may be attached directly to the adjacent atom in formula I or it may be covalently linked thereto through a phenylene linkage.

The nonionic monomeric emulsion stabilizer I can be readily synthesized from commercially available materials. Thus, compounds I where R is

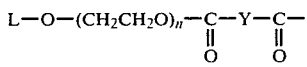

are prepared by first reacting a nonionic surfactant containing a terminal hydroxyl group and having the formula L—O—(CH$_2$CH$_2$O)$_n$H, L and n being as previously defined, with an appropriate dicarboxylic acid anhydride to form an intermediate reaction product II.

Exemplary anhydrides include succinic anhydride, methyl succinic anhydride, glutaric anhydride, maleic anhydride, itaconic anhydride, phthalic anhydride, tetrachlorophthalic anhydride, tetrabromophthalic anhydride, tetrafluorophthalic anhydride, methyl phthalic anhydride, iso-propylphthalic anhydride, butyl phthalic anhydride, etc.

Nonionic surfactants suitable for reaction to provide compounds I include nonyloxypoly(ethyleneoxy)e- thanol containing 8 ethyleneoxy groups, nonyloxypoly(ethyleneoxy)ethanol containing 49 ethyleneoxy groups, octacosyloxypoly(ethyleneoxy)ethanol containing 8 ethyleneoxy groups, octacosyloxypoly(ethyleneoxy) ethanol containing 49 ethyleneoxy groups, nonylphenoxy(ethyleneoxy)ethanol containing 8 ethyleneoxy groups, nonylphenoxy (ethyleneoxy)ethanol containing 49 ethyleneoxy groups, octacosylphenoxy(ethyleneoxy)ethanol containing 8 ethyleneoxy groups, octacosylphenoxy(ethyleneoxy)ethanol containing 49 ethyleneoxy groups, poly(oxypropylene)-poly(oxyethylene) glycols having the formula

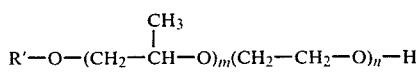

wherein R', m and n are as previously described, etc. These nonionic surfactants are generally commercially available, but they may be readily prepared by reacting an alcohol having the formula LOH where L is as previously described with ethylene oxide in the presence of potassium acetate, alkali metal hydroxide, etc.

The intermediate II thus prepared is then reacted with glycidyl acrylate, glycidyl methacrylate, allyl glycidyl ether or methallyl glycidyl ether to provide the aforementioned compound I where V is acryloyloxy-2-hydroxypropyl, methacryloyloxy-2-hydroxypropyl allyloxy-2-hydroxypropyl or methallyloxy-2-hydroxypropyl. Compounds I where V is other than described in the previous sentence are provided by reacting intermediate II with hydroxyethyl acrylate, hydroxyethyl methacrylate, allyl alcohol or methallyl alcohol in the presence of an esterification catalyst such as toluene sulfonic acid, hydrochloric acid, sulfuric acid, etc.

Compounds I where R is

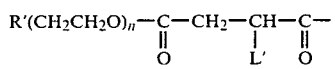

and V is acryloyloxy-2-hydroxypropyl, methacryloyloxy-2-hydroxypropyl, allyloxy-2-hydroxypropyl or methallyloxy-2-hydroxypropyl are provided by reacting a succinic anhydride containing an aliphatic hydrocarbon chain L' with a glycol having the formula R'—(CH$_2$CH$_2$O)$_n$H wherein R' and n are as previously described, followed by reaction with glycidyl acrylate, glycidyl methacrylate, allyl glycidyl ether or methallyl glycidyl ether. Suitable substituted succinic anhydrides can be prepared by reacting maleic anhydride with an olefin as described in U.S. Pat. No. 2,741,597. Illustrative compounds include octacosasuccinic anhydride, n-octyl succinic anhydride, iso-octadecenyl succinic anhydride, etc.

Those compounds where R is

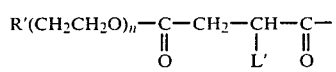

and V is other than described in the preceding paragraph are prepared by reacting the aforementioned succinic anhydride containing an aliphatic hydrocarbon chain L' with allyl alcohol, methallyl alcohol, hydroxyethyl acrylate, hydroxyethyl methacrylate, 2-hydroxypropyl acrylate or 2-hydroxypropyl methacrylate followed by reaction with ethylene oxide or a glycol having the formula R'—(CH$_2$CH$_2$O)$_n$H wherein R' and n are as previously described.

In all of the aforementioned routes, the reactant containing the aliphatic hydrocarbon chain is preferably a mixture differing in the identity of the aliphatic hydrocarbon group.

The reactions to provide compounds I proceed at temperatures from about 0° C. up to 100° C. While the reactions proceed in the absence of solvents, generally a diluent such as ethyl acetate, acetonitrile, dimethylformamide, methanol, methylene chloride, or a monomer to be subsequently copolymerized with compound I is employed. Catalyst such as potassium acetate, triethyl amine, mineral acids, etc. can be used in reactions between an alcohol and an anhydride, while potassium acetate, potassium hydroxide, etc. catalyze reactions between an alcohol and an epoxide.

Preferred monomeric emulsion stabilizers are those compounds I where R is

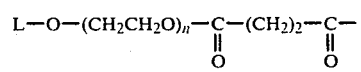

and V is methacryloyloxy-2-hydroxypropyl or allyloxy-2-hydroxypropyl. Particularly preferred of the aforementioned compounds are those where L comprises an aliphatic hydrocarbon chain.

Illustrative ethylenically unsaturated monomers suitable for copolymerizing with the monomeric emulsion stabilizers of this invention comprise vinyl acetate, vinyl chloride, acrylonitrile, and acrylic monomers in general represented by the formula

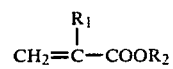

where R$_1$ is a hydrogen atom or a methyl group, and R$_2$ is an alkyl radical of 1 to 14, and preferably 1 to 4 carbon atoms.

Mixtures of more than one such ethylenically unsaturated monomer may be used, and in order to impart special properties or to modify the properties of the polymer, a minor proportion, usually less than 20 mole percent, of the major monomer may be replaced by some other ethylenically unsaturated monomer such as vinyl esters other than vinyl acetate as typified by vinyl laurate and vinyl stearate; vinyl ethers such as vinyl methyl ether, vinyl ethyl ether and vinyl butyl ether; di-unsaturated monomers such as diethylene glycol diacrylate, ethylene glycol diitaconate, diallyl phthalate, divinyl benzene and the like; acrylic and methacrylic acids, acrylamide and methacrylamide, hydroxyethyl acrylate and methacrylate, hydroxypropyl acrylate and methacrylate, and styrene.

The polymerization process is carried out by emulsion polymerization techniques, employing a redox or non-redox catalyst system. Illustrative redox catalyst systems are hydrogen peroxide/ascorbic acid and ferrous ammonium sulfate, tert-butyl hydrogen peroxide/ascorbic acid and ferrous ammonium sulfate, potassium persulfate/sodium bisulfite, potassium persulfate/sodium metabisulfite, etc. Non-redox catalysts include hydrogen peroxide, potassium persulfate, etc. Polymerization can be carried out by a batch loaded technique wherein an emulsion of monomers and monomeric emulsion stabilizer, prepared by agitating the monomers and stabilizer in an aqueous medium, is sparged with nitrogen and then the catalyst system is added to the emulsion. The delayed addition technique of polymerization can also be used; in an example of this process using a redox catalyst system, an emulsion of monomers and monomeric emulsion stabilizer containing the peroxide or persulfate is prepared. A portion of this emulsion is added to the reactor along with the ascorbic acid and ferrous ammonium sulfate, or potassium persulfate respectively. The remainder of the emulsion is added slowly, usually over a period of one hour. The polymerization reactions are initiated at various temperatures, depending on the catalyst system. Thus, redox systems are preferably initiated at temperatures of about 0° C. to ambient and non-redox systems at about 50°–60° C.

In general, in the polymerization process of this invention, 0.1 to 10 percent by weight of monomeric emulsion stabilizer is employed, with 1 to 5 percent by weight being preferred. The amount of monomeric emulsion stabilizer is based on the total monomers added to the polymerization reaction. Mixtures of compounds having the formula I can be used.

Aqueous polymeric dispersions may be prepared according to this invention in which the solid polymer content is as high as 40% to 50% by weight. If desired, the solids content may be diluted to 1% by weight or less, with excellent retention of stability at both the higher and lower concentrations.

The monomeric emulsion stabilizers of this invention are useful in both batch and continuous polymerization processes.

The material "N-t-$C_{12}$ maleamic acid" in the following examples is a mixture of maleamic acid monomers prepared by the amidation of maleic anhydride with Primene 81-R. This Primene 81-R is a mixture of t-alkyl primary amines marketed by The Rohm and Haas Company. It contains such amines as t-butyl amine; 1,1,3,3-tetramethylbutyl amine; 1,1,3,3,5,5-hexamethylhexyl amine; 1,1,3,3,5,5,7,7-octamethyloctyl amine; 1,1,3,3,5,5,7,7,9,9-decamethyldecyl amine; and 1,1,3,3,5,5,7,7,9,9,11,11-dodecamethyldodecyl amine. Primene 81-R consists principally (90%) of $C_{11}$ to $C_{14}$ branched alkyl amines. The neutral equivalent of Primene 81-R is 191 corresponding to an alkyl amine having an average alkyl group of about 12 carbon atoms.

EXAMPLE 1

A mixture of 10 g. succinic anhydride, 154 g. Igepal CO-880 and 6.6 g. potassium acetate in 200 ml. ethyl acetate were heated, with stirring, at 80° C. for 12 hours. Igepal CO-880 is a nonylphenoxypoly(ethyleneoxy)ethanol containing 29 ethyleneoxy groups and is marketed by General Aniline and Film Corp. Potentiometric titration for carboxylic acid with standard sodium hydroxide indicated that a 92% yield of the reaction product of succinic anhydride and Igepal CO-880 had been obtained. Then 14.2 g. glycidyl methacrylate was added to the reaction solution and heating, with stirring, at 80° C. was continued for 7 hours. Potentiometric titration of the solution revealed that a 72% yield of a product having the following formula had been obtained:

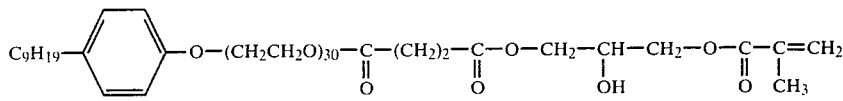

A mixture of 13.4 g. of ethyl acrylate, 75.2 g. 2-ethylhexylacrylate, 4.1 g. acrylonitrile and 7.2 g. N-t-$C_{12}$ maleamic acid in 180.0 g. water was emulsified under a blanket of nitrogen employing 11.6 ml. of the solution obtained in the preceding paragraph (containing 8.0 g. of the product represented by the formula in the above paragraph) as the monomeric emulsion stabilizer. The pH of the resulting emulsion was 4.5–5.0. After cooling the emulsion to 16° C., 10 ml. of 3% by weight aqueous hydrogen peroxide was added, followed by the dropwise addition of a reductant solution prepared by dissolving 0.02 g. ferrous ammonium sulfate and 0.4 g. ascorbic acid in 10 g. water. Polymerization was initiated and an exotherm of 10° C. was observed over a period of 11 minutes after initiation. A total of 4 ml. of reductant solution was employed in the polymerization. The end of the polymerization was indicated by the absence of an exotherm upon the addition of an increment of hydrogen peroxide and reductant solution. The conversion was 90%.

Following the above procedure and employing the same reactants and amounts, but using 4.3 ml. (3.1 g.) of monomeric emulsion stabilizer, a polymer was prepared. The pH was adjusted to 3.0 with hydrochloric acid. An exotherm of 14° C. was observed over a period of 10 minutes after initiation. A total of 5 ml. of reductant solution was employed; the conversion was 95%.

EXAMPLE 2

A mixture of 10.0 g. succinic anhydride, 86.0 g. Tergitol 15-S-15 and 3.8 g. potassium acetate in 100 ml. of ethyl acetate was heated at 80° C. for 1 hour. Tergitol 15-S-15 is a nonionic surfactant made by oxyethylating linear $C_{11}$–$C_{15}$ alcohols with 15 moles of ethylene oxide; it is a product of Union Carbide Corporation. Solvent was removed to give 100 g. of slightly hazy, viscous liquid. Then 14.2 g. glycidyl methacrylate was added to the viscous liquid and the resulting reaction mixture tumbled for 7 days at room temperature to provide a pale yellow oil. Potentiometric titration for carboxylic acid indicated that the following product had been obtained in 94% yield:

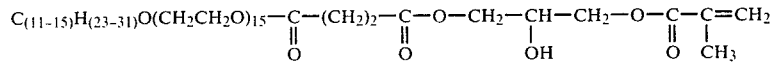

Following the polymerization procedure of Example 1, a mixture of 13.8 g. ethyl acrylate, 77.3 g. octyl acrylate, 4.3 g. acrylonitrile and 7.4 g. N-t-$C_{12}$ maleamic acid in 180.0 g. water was emulsified using 2.8 ml. of the liquid obtained in Example 1, paragraph one, and 3.1 g. of the pale yellow oil obtained in this example. The pH of the emulsion was 5.0–5.5. Twelve ml. of 3% aqueous hydrogen peroxide was added and an exotherm of 10°

C. was observed over a period of 14 minutes after initiation; a total of 5.8 ml. of reductant solution was employed. The conversion to polymer was 93%.

EXAMPLE 3

Following the procedure of the previous examples, a mixture of 30.0 g. succinic anhydride, 191.4 g. Tergitol Nonionic 12-P-9, 8.84 g. triethyl amine (80% pure) and 100 ml. ethyl acetate was heated at 80° C. for 4 hours. Tergitol Nonionic 12-P-9, a product of Union Carbide Corporation is dodecylphenol oxyethylated with 9 moles of ethylene oxide. Solvent removal provided 218 g. viscous yellow liquid intermediate. The amount of 36.9 g. of the yellow liquid was tumbled with 5.7 g. allyl glycidyl ether and 1.7 g. potassium acetate at room temperature for 14 days. Potentiometric titration revealed that a 93% yield of product having the following formula had been obtained:

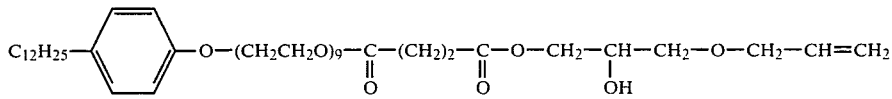

Following the polymerization procedure and using the reductant solution of the previous examples, a mixture of 45.0 g. butyl acrylate and 55.0 g. vinyl acetate in 260.0 g. water was emulsified with 2.0 g. of the liquid reaction product prepared above and 1.0 g. of a quaternary compound prepared by reacting dimethylaminoethyl maleic acid ester, chloroacetamide and sodium lauryl sulfate as described in copending application Ser. No. 110,588, filed Jan. 28, 1971. The pH of the emulsion was 3.5. Twenty-three ml. of 3% aqueous hydrogen peroxide was added and an exotherm of 20° C. observed over a period of ½ hour after initiation. The mixture was then heated at 65°–70° C. for ½ hour. A total of 14.0 ml. of reductant solution was used and the percent conversion to polymer was 82.

EXAMPLE 4

The amount of 36.9 g. of the viscous yellow liquid intermediate prepared in Example 3 was tumbled with 7.1 g. glycidyl methacrylate and 0.9 g. potassium acetate in 25 ml. ethyl acetate at room temperature for 21 days. Potentiometric titration for carboxylic acid indicated that a 100% yield of the following product had been obtained.

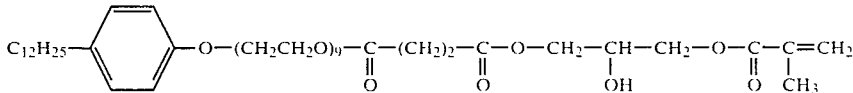

EXAMPLE 5

A mixture of 10.0 g. succinic anhydride, 242.0 g. of Igepal CO-970 and 5 g. potassium acetate in 150 ml. ethyl acetate was heated, with stirring, at 80° C. for 8 hours. Igepal CO-970 is nonyl phenoxypoly(ethyleneoxy)ethanol containing 50 ethyleneoxy groups marketed by General Aniline and Film Corp. Solvent was removed from a portion of the reaction mixture to provide 50.4 g. of an off-white waxy solid. This solid was mixed with 2.84 g. glycidyl methacrylate, 0.5 g. potassium acetate and 75 ml. ethyl acetate and the resulting mixture stirred at 60° C. for 15 hours. Potentiometric titration confirmed that the following product had been obtained:

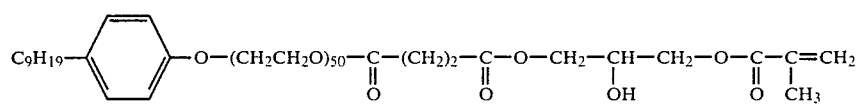

EXAMPLE 6

A mixture of 14.5 g. tetrapropenyl succinic anhydride, an alkenyl succinic anhydride having an average of 12 carbon atoms and one carbon-carbon double bond and marketed by Monsanto Corporation, 37.5 g. Carbowax 750, a methoxypolyethylene glycol having a formula molecular weight range of 715 to 785 and sold by Union Carbide Corporation, and 1.0 g. potassium acetate in 51.9 ethyl acetate was tumbled for 5 days at room temperature and then heated for 3½ hours at 50° C. Potentiometric titration for carboxylic acid confirmed that the reaction product of tetrapropenyl succinic anhydride and Carbowax 750 had been obtained. Then 7.1 g. glycidyl methacrylate was added to the above solution and the resulting solution tumbled at room temperature for 12 days. Potentiometric titration revealed the absence of carboxylic acid, confirming that the following product had been obtained:

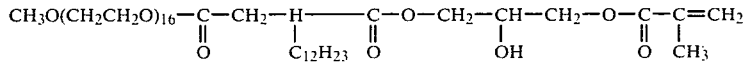

Following the polymerization procedure of Example 1, a mixture of 11.0 g. ethyl acrylate and 40.0 g. 2-ethylhexyl acrylate in 153.0 g. water was emulsified using 4.8 ml. of the liquid prepared above (containing 2.55 g. of product). The pH of the resulting emulsion was about 5.0. The amount of 0.5 ml. of 30% aqueous hydrogen peroxide was added and 1.0 ml. of the reductant solution of Example 1 initiated polymerization. An exotherm of 14° C. was observed over a period of 10 minutes and a total of 6.0 ml. of reductant solution was used. The conversion to polymer was 90–100%.

What is claimed is:

1. A compound having the formula

ROV wherein V is 2-acryloyloxyethyl, 2-methacryloyloxyethyl, 3-acryloyloxy-2-hydroxypropyl, 3-methacryloyloxy-2-hydroxypropyl, allyl, methallyl, 3-allyloxy-2-hydroxypropyl or 3-methallyloxy-2-hydroxypropyl and R is

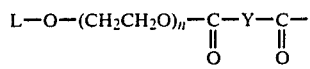

wherein Y is O-phenylene or O-phenylene in which one or more of the hydrogen atoms is replaced by a lower alkyl group or by a halogen atom; n is an integer from 9 to 50; L is $C_8$ to $C_{28}$ aliphatic hydrocarbon linked to the oxygen directly or covalently thereto through a phenylene linkage.